(No Model.)
C. H. LINNEY.
CHURN.
No. 581,742. Patented May 4, 1897.
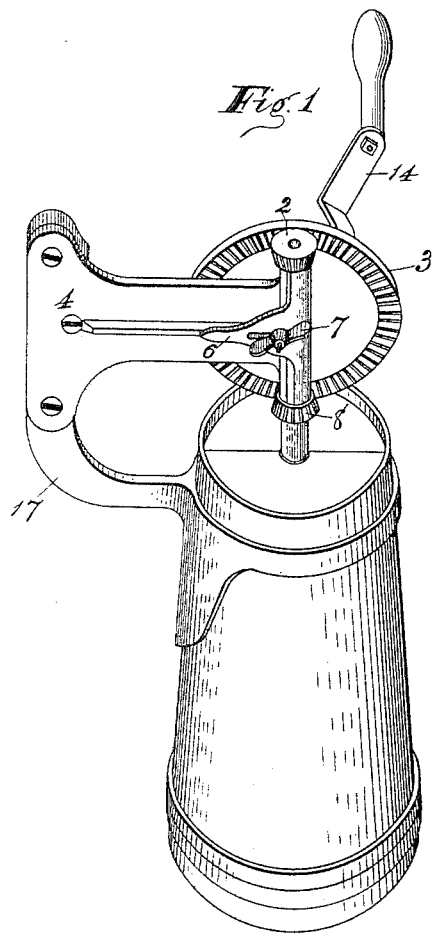
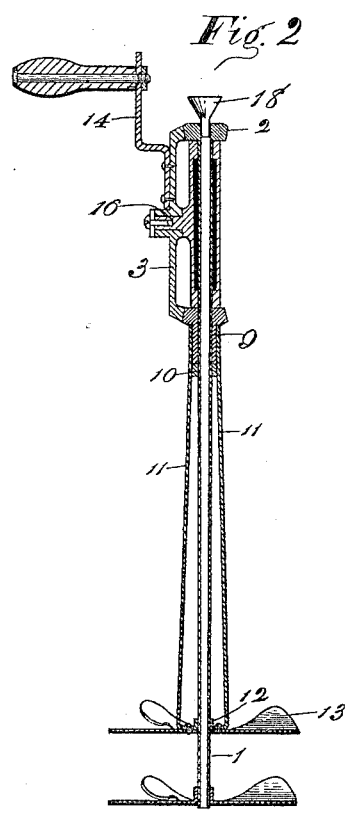
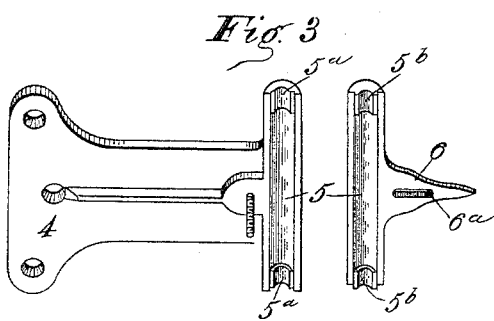
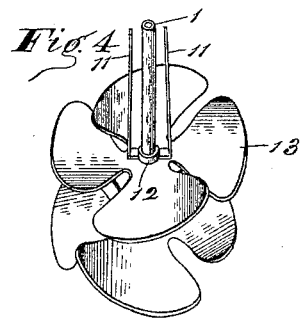
WITNESSES
E. E. Overholt
A. H. Miller
Chas. H. Linney INVENTOR
By J. W. T. FitzGerald
ATTY'S.

UNITED STATES PATENT OFFICE.

CHARLES H. LINNEY, OF EMINENCE, KENTUCKY.

CHURN.

SPECIFICATION forming part of Letters Patent No. 581,742, dated May 4, 1897.

Application filed December 5, 1896. Serial No. 614,555. (No model.)

*To all whom it may concern:*

Be it known that I, CHARLES H. LINNEY, a citizen of the United States, residing at Eminence, in the county of Henry and State of Kentucky, have invented certain new and useful Improvements in Churns; and I do hereby declare the following to be a full, clear, and exact description of the invention, such as will enable others skilled in the art to which it appertains to make and use the same.

My invention, as will be hereinafter fully described and claimed, reference being had to the accompanying drawings, has relation to certain new and useful improvements in churns.

The object of my invention is to provide reliably-efficient means for thoroughly agitating the cream, producing a churn which will expeditiously perform its work.

Referring to the drawings made a part of this application, Figure 1 is a perspective view of my invention complete. Fig. 2 is a central vertical section of the dashers and the operating mechanism. Fig. 3 is a detail perspective view of the supporting-bracket. Fig. 4 is a detail perspective view of the dashers proper.

References to the several parts will be made by figures, each figure referring to the same part throughout the several views.

In materializing my invention I provide the tubular shaft 1, which extends to near the bottom of the churn body or vessel containing the cream, and is provided on its lower end with a bladed dasher, which is fully illustrated in Fig. 5 of the drawings.

The upper end of the tubular shaft 1 is provided, preferably, with a bevel-gear 2, adapted to mesh with the controlling-gear 3. In order to reliably hold said shaft in its operative position, I provide the bracket 4, having the bearing-seat 5, adapted, in connection with the clamping-blade 6, to encircle and hold the shaft to its work.

The clamping-section 6 is preferably held in union with the bearing-seat by the thumb-screw 7, though the equivalent thereof may be used. At the lower end of the bearing-seat, adapted to mesh with the lower side of the controlling-gear 3, I provide the bevel-gear 8, rigidly mounted upon the rotary collar 9 and adapted to move therewith. Said gear 8 is held in position against the lower end of the seat 5 and into engagement with the lower side of the controlling-gear 3 by the fixed collar 10, integrally formed with said shaft or otherwise secured thereto, reliably holding the collar 9 in position.

Integrally formed with the collar 9 or attached thereto in any preferred manner are the downwardly-extending arms or sections 11, which reach substantially parallel with said shaft nearly to the lower end thereof, where they terminate and are secured to the rotary collar 12. The collar last mentioned has also securely attached to it the rotary dasher 13, which is formed substantially the same as the lower dasher. When said dashers are thus mounted in their respective operative positions, it will be observed that they will have an opposite movement with respect to each other, tending greatly to effect a thorough agitation of the contents of the churn.

The controlling-gear 3 is provided upon its outer side with the usual operating crank or handle 14. A journal or bearing 16 is formed upon the outer side of the bearing-seat 5, adapted to receive the said controlling-gear and reliably hold it in position in such a manner as to permit it to be freely rotated thereon by said crank.

The outer end of the bracket 4 is preferably connected to the arm 17, secured to the churn-body in any preferred way, though it will be understood that said bracket may be, if desired, secured directly to any suitable convenient object—such, for instance, as to a table or wall. If desired, a standard (not shown) may be erected upon a suitable base adapted to be conveniently moved from place to place, if found necessary and desirable to do so.

I prefer to form the bearing-seat with the bearing-faces 5ª cast therewith or otherwise intimately connected, and as the removable section 6 carries the completing half of said bearing-points 5ᵇ it will be appreciated that the construction involved is of a simple and inexpensive character. As a ready and reliable means for compensating for wear upon said bearing-points, I provide that the contacting edges or faces thereof may be cut away or otherwise removed, bringing the parts closer together and thus taking up any excess of wear.

The collar 9 is adapted to snugly fit within the bearing seat or aperture provided in the lid of the churn, which for convenience may be made in two parts, each half being easily removed and replaced when it is desired to have access to the contents of the churn.

The operation of my improved churn may be stated to be as follows: The dashers are set in motion by simply turning the handle attached to the operating-gear 3, when the dashers will be reversely rotated with respect to each other, and by means of the peculiar adjustment of the blades thereof the contents of the churn will be lifted, enabling a utilization of gravity to be made as the falling contents will strike the lower dasher or the bottom of the churn. This action will incidentally draw the air down through the tubular shaft and cause the same to be introduced into and commingled with the cream, thoroughly aerating the same and rendering it more susceptible to the action of said blades, and also permit any undesirable odors in the cream to escape.

It will be understood that any preferred number of blades may be provided, though it is thought that it will be found in practice that four blades will give the best results. I do not wish, however, to be confined to any specified number and sizes with respect to the same.

It will be observed that the forward edge of each of the blades is depressed, while the rear edge thereof is correspondingly elevated, thus providing each blade with a lifting capacity when positively rotated and with a depressing capacity when reversely rotated.

It may be found to be desirable during the process of churning to alternate the movement of the controlling-gear 3, imparting a corresponding movement to the rotary dashers, resulting in a more perfect agitation of the cream, all of which will be readily apparent.

By means of the positive grasp had upon the tubular shaft by the bearing-seat 5 it will be found unnecessary to anchor the lower end of said shaft, thus dispensing with the necessity of providing a bearing point or seat in the bottom of the churn, as is usual.

The upper end of the tubular shaft is provided with the funnel 18, which is preferably attached thereto by screw-threads, as shown. Said funnel affords a convenient means for introducing hot or cold water into the cream when it is desired to raise or lower the temperature thereof and bring the same to the proper temperature to effect the best results and thus cause a concentration of the butter-globules.

The clamp-section 6 is provided with the slotted aperture 6ª, thus providing that the thumb-screw may be merely loosened, when said section may be withdrawn out of the way, permitting the tubular shaft to be readily removed from its seat.

Believing that the advantages, operation, and construction of my improved churn will be readily apparent from the foregoing description, further reference is deemed unnecessary, and,

Having thus described my invention, what I claim as new, and desire to secure by Letters Patent, is—

As an improvement in churns, the combination with the body having a retaining-arm secured thereto, of a bearing supporting-bracket attached to said arm, said bracket consisting of the fixed member 4 and the slotted adjustable member 6, each provided with registering bearing-seats; a tubular shaft vertically held in position by said bracket and having a funnel or flared upper end permanently secured thereto; an actuating-gear journaled on said bracket; inclined rotary dashers connected to said shaft; a rotary sleeve, mounted on said shaft and carrying inclined rotary dashers secured to said sleeve, and means for so connecting them with said gear that they will be reversely rotated with respect to each other, substantially as described and for the purpose set forth.

In testimony whereof I affix my signature in presence of two witnesses.

CHARLES H. LINNEY.

Witnesses:
JOHN R. LYELL,
A. E. JONES.